No. 750,684. PATENTED JAN. 26, 1904.
R. E. OLDS.
VALVE GEAR FOR EXPLOSIVE ENGINES.
APPLICATION FILED OCT. 18, 1901.
NO MODEL.
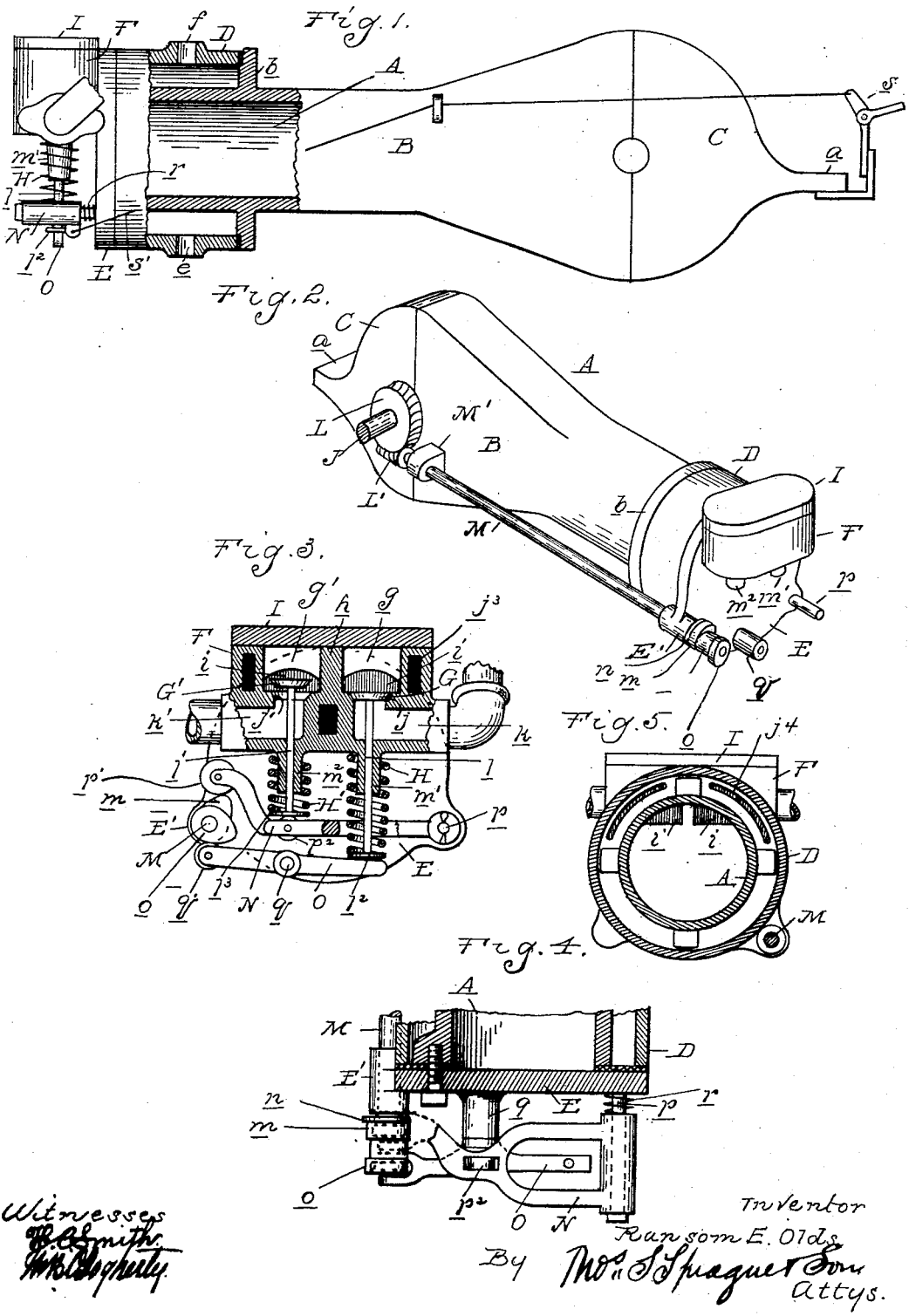

No. 750,684. Patented January 26, 1904.

UNITED STATES PATENT OFFICE.

RANSOM E. OLDS, OF DETROIT, MICHIGAN, ASSIGNOR TO OLDS MOTOR WORKS, OF DETROIT, MICHIGAN, A CORPORATION OF MICHIGAN.

VALVE-GEAR FOR EXPLOSIVE-ENGINES.

SPECIFICATION forming part of Letters Patent No. 750,684, dated January 26, 1904.

Application filed October 18, 1901. Serial No. 79,082. (No model.)

*To all whom it may concern:*

Be it known that I, RANSOM E. OLDS, a citizen of the United States, residing at Detroit, in the county of Wayne and State of Michigan, have invented certain new and useful Improvements in Valve-Gears for Explosive-Engines, of which the following is a specification, reference being had therein to the accompanying drawings.

The invention relates to explosion-engines; and it consists in certain features of construction, as more fully hereinafter described and claimed.

In the drawings, Figure 1 a side elevation, partly in section, of the engine. Fig. 2 is a perspective view thereof with some of the parts removed. Fig. 3 is a cross-section through the valve-chest, showing the arrangement of operating mechanism for the valves. Fig. 4 is a central horizontal section through the end of the cylinder and head, showing the valve-operating mechanism in plan. Fig. 5 is a cross-section through the cylinder looking toward the detachable head.

A is the engine-cylinder, and B is the crank-casing, which are preferably cast integral. The casing B preferably extends to the plane of the crank-shaft and has half-bearings for said shaft formed thereon, while the complementary bearings and casing are formed upon a detachable cap member C. This cap is also provided with a forwardly-projecting lug $a$, serving as means for securing the engine-casing to its supporting-framework.

The cylinder A is provided externally with an annular flange $b$, which is adapted to form a seat for one end of a surrounding jacket D, the opposite end of said jacket being flush with the end of the cylinder.

E is a detachable cylinder-head which is secured to the cylinder by bolts or screws engaging with lugs or ears upon said cylinder. The diameter of this head is such as to not only close the end of the cylinder, but also to overlap the edge of the jacket D, and a tight joint is formed by suitable packing at the ends of the jacket and between the end of the cylinder and head. The jacket D is spaced from the cylinder, so as to form a chamber for the cooling fluid, which is adapted to circulate through said jacket, entering through an aperture $e$ at the lower end thereof and passing out when heated through the aperture $f$ at the top. These apertures are connected with the conduits of a cooler system, which forms no part of the present invention and is therefore not shown in the drawings.

The head E carries and is preferably formed integral therewith the valve-chest F. This, as shown, preferably projects outward upon one side of the center of the head or in the preferable horizontal arrangement of the engine above the center line thereof, and the chest has formed therein two chambers $g$ $g'$, separated from each other by a central partition $h$, both connecting through ports $i$ with the cylinder. Within these chambers are formed the valve-seats $j$ and $j'$, surrounding the ports $k$ $k'$, which respectively open out upon opposite ends of the chest and are adapted to be connected with the induction and eduction pipes of the engine.

G and G' are valves for the seats $j$ and $j'$, which valves are preferably provided with stems $l$ $l'$, passing downwardly through apertured nipples $m'$ and $m^2$, projecting downward from the chest.

H and H' are springs sleeved upon the nipples $m$ $m'$ and bearing at their lower ends against collars or heads $l^2$ and $l^3$, secured to the lower ends of the valve-stems. The chambers $g$ and $g'$ in the chest are open at their upper ends to permit of the insertion of the valves G and G' therein, and to then close said chambers a detachable cover I is bolted or otherwise secured to the chest.

J is the crank-shaft, which is journaled in bearings in the casing B and cap C, as before described. Upon one side of the casing B is secured to said shaft a worm-wheel L, meshing with the corresponding worm L' upon a longitudinal-extending shaft M. This shaft is journaled in a bearing M', preferably formed integral with the casing B, and at its opposite end engages with a bearing E', preferably formed integral with the cylinder-head E. The end of the shaft M projects beyond the bearing E' and carries the cams $m$, $n$, and $o$.

N is a lever preferably fulcrumed at one end upon a post $p$, projecting from the head E and at its opposite end carrying an antifriction-roll $p'$, adapted to bear against the cam $m$. Intermediate the ends of this lever is the antifriction-roll $p^2$, which is adapted to bear against the under face of the roller or head $l^3$.

O is a second lever preferably fulcrumed upon the post $q$, secured to the head E and below the lever N. One end of this lever O is preferably provided with an antifriction-roll $q'$, adapted to bear against the cam $o$, while the opposite end of said lever is adapted to bear against the collar or head $l^2$. The arrangement of these levers is such that in the rotation of the shaft M the cams $m$ and $o$ will respectively operate the levers N and O, which in turn will bear upon the stems $l$ and $l'$ of the valves and cause the opening and closing of said valves in proper timed relation. The lever N is not only pivoted upon the pin $p$, but is capable of a limited longitudinal movement thereon. In its normal position it is held outward upon said pin by the spring $r$, sleeved upon said pin between the lever and the cylinder-cover. In this position the antifriction-roll $p'$ bears upon the cam $m$, as before described. If, however, the lever is moved inward against the tension of the spring $r$, the roll $p'$ will be shifted in position so as to disengage from the cam $m$ and come into the path of the cam $n$. The purpose of this construction is to permit of relieving the resistance caused by the compression of the initial charge in starting the engine. Thus the cam $n$ is of such a shape as to hold the exhaust-valve open for a longer period than is accomplished by the cam $m$, and this permits a portion of the charge to escape before compression takes place. As a result the pressure developed by compressing the charge is not sufficient to prevent the turning of the crank-shaft. For operating the lever N to shift the same laterally upon the pin $p$ a lever $s$ is arranged in convenient position for operation which has a suitable connection, such as the wire $s'$, with the lever N.

The construction being as before described, in general operation the rotation of the crank-shaft will be communicated through the worm-gear connection to the shaft M, and the latter will rotate the cams $m$, $n$, and $o$, which will cause the operation of the levers and valves in the manner before described. It is therefore deemed unnecessary to give any further description of the operation.

In order that the valve-chest F may be cooled as well as the cylinder, the casting is preferably curved to form chambers, such as $j^3$, for a cooling fluid. These chambers communicate with the annular water-chamber between the jacket D and cylinder A by segmental ports $j^4$, formed in the head E. Thus the water within the jacket D will pass into the port $j^4$ and circulate through the chambers $j^3$, thereby reducing the temperature of the chest.

What I claim as my invention is—

1. In an explosion-engine, the combination with a cylinder-head, of a valve-chest projecting outward from a segment of said head, admission and exhaust valves in said chest, stems for said valves projecting outward from said chest toward the complementary segment of said head, a rotary shaft at one side of said complementary portion of the head having admission, exhaust and relief cams thereon, a lever forming an intermediate connection between said admission-cam and the stem of said admission-valve, a second lever extending across said complementary segment of said head and bifurcated to embrace the stem of said admission-valve, said lever being adapted to engage with said exhaust-cam and the stem of said exhaust-valve and being fulcrumed at its opposite end, and means for shifting said lever upon its fulcrum into engagement with said relief-cam.

2. In an explosion-engine, the combination with a cylinder-head, of a valve-chest projecting outward from a segment of said head, admission and exhaust valves in said chest, stems for said valves projecting outward from said chest toward the complementary segment of said head, a rotary shaft at one side of said complementary portion of the head having admission and exhaust cams thereon, a lever forming an intermediate connection between said admission-cam and the stem of said admission-valve, a second lever extending across said complementary segment of said head and bifurcated to embrace the stem of said admission-valve, said lever being adapted to engage with said exhaust-cam and the stem of said exhaust-valve.

3. In an explosion-engine, the combination with a cylinder-head, of a valve-chest projecting outward from a segment of said head, admission and exhaust valves in said chest, stems for said valves projecting outward from said chest toward the complementary segment of said head, a rotary shaft at one side of said complementary portion of the head having admission and exhaust cams thereon, a lever pivoted intermediate its ends on the complementary portion of the head forming an intermediate connection between said admission-cam and the stem of said admission-valve, a second lever extending across said complementary segment of said head pivoted at its end and adapted to engage with said exhaust-cam and the stem of said exhaust-valve.

4. In an explosion-engine, the combination with a cylinder-head, of a valve-chest projecting outward from a segment of said head, admission and exhaust valves in said chest, stems for said valves projecting outward from said chest toward the complementary segment of said head, a rotary shaft at one side of said complementary portion of the head having admission, exhaust and relief cams thereon, a lever forming an intermediate connection between said admission-cam and the stem of said admission-valve, a second lever extending across said complementary segment of said head adapted to engage with said exhaust-cam and the stem of said exhaust-valve and being fulcrumed at its opposite end, and means for shifting said lever upon its fulcrum into engagement with said relief-cam.

5. In an explosion-engine, the combination with a cylinder-head, of a valve-chest projecting outward from a segment of said head, admission and exhaust valves in said chest, stems for said valve projecting outward from said chest toward the complementary segment of said head, a rotary shaft at one side of said complementary portion of the head having admission and exhaust cams thereon, a lever pivoted intermediate its ends on the complementary portion of the head forming an intermediate connection between said admission-cam and the stem of said admission-valve, a second lever extending across said complementary segment of said head pivoted at its end and bifurcated to embrace the stem of said admission-valve, said lever being adapted to engage with said exhaust-cam and the stem of said exhaust-valve.

In testimony whereof I affix my signature in presence of two witnesses.

RANSOM E. OLDS.

Witnesses:
 M. B. O'DOGHERTY,
 H. C. SMITH.